(12) United States Patent
Hata (10) Patent No.: US 6,201,451 B1
(45) Date of Patent: Mar. 13, 2001

(54) MSK MODULATOR AND MSK MODULATION METHOD OF TRANSMITTING DATA AT HIGH SPEED AND DIGITAL SIGNAL GENERATOR SUITABLE FOR MSK MODULATION

(75) Inventor: Katsufumi Hata, Nara (JP)

(73) Assignee: UCOM Incorporated, Osaka (JP)

( * ) Notice: Subject to any disclaimer, the term of this patent is extended or adjusted under 35 U.S.C. 154(b) by 0 days.

(21) Appl. No.: 09/301,055

(22) Filed: Apr. 28, 1999

(30) Foreign Application Priority Data

Dec. 18, 1998 (JP) .................................................. 10-359896

(51) Int. Cl.[7] .............................. H03C 3/00; H04L 27/12
(52) U.S. Cl. ............................................ 332/100; 375/305
(58) Field of Search ..................................... 332/100–103; 375/305

(56) References Cited

U.S. PATENT DOCUMENTS 5,942,955 * 8/1999 Matui ..................................... 332/101
6,025,758 * 2/2000 Lu ......................................... 332/100

FOREIGN PATENT DOCUMENTS 5-63742    3/1993   (JP) .

* cited by examiner

Primary Examiner—David Mis
(74) Attorney, Agent, or Firm—Frishauf, Holtz, Goodman, Langer & Chick, P.C.

(57) ABSTRACT

An MSK modulator which performs an accurate MSK modiation with high speed digital data is provided. When a to-be-modulated digital signal is provided from a code generator 1, a bidirectional shift register 2 allows a bit-row with sixteen bits to shift in circulation in a direction determined in accordance with a logic value of the supplied digital signal. Weighting adders 3I and 3Q weight and add logic values of the fifth to twelfth least significant bits in the bit row and logic values of the first to eighth least significant bits in the bit row. Two analog signals each of which is generated by the weighting adders 3I and 3Q are out of phase to each other by $(\pi/2)$ radians. The analog signal generated by the weighting adder 3I is multiplied by a signal generated by a first local oscillator 7, whereas the analog signal generated by the weighting adder 3Q is multiplied by a signal generated by a phase shifter 8. An adder 9 adds these multiplication results to generate an MSK modulation wave.

12 Claims, 6 Drawing Sheets

FIG. 6
PRIOR ART

MSK MODULATOR AND MSK MODULATION METHOD OF TRANSMITTING DATA AT HIGH SPEED AND DIGITAL SIGNAL GENERATOR SUITABLE FOR MSK MODULATION

BACKGROUND OF THE INVENTION

1. Field of the Invention

The present invention relates to an MSK (Minimum Shift Keying) modulator and an MSK modulation method, and more particularly to an MSK modulator and an MSK modulation method of transmitting data at high speed.

2. Description of the Related Art

An MSK modulation method has been widely employed as a technique for transmitting a digital signal. The well-known MSK modulation technique allows a phase of a ($\pi/2$) radian section (that is, for a quarter period) of a carrier wave to shift substantially :t ($\pi/2$) radians in a continuous manner, in accordance with a logic value of bits of a to-be-transmitted digital signal.

Figure 6:
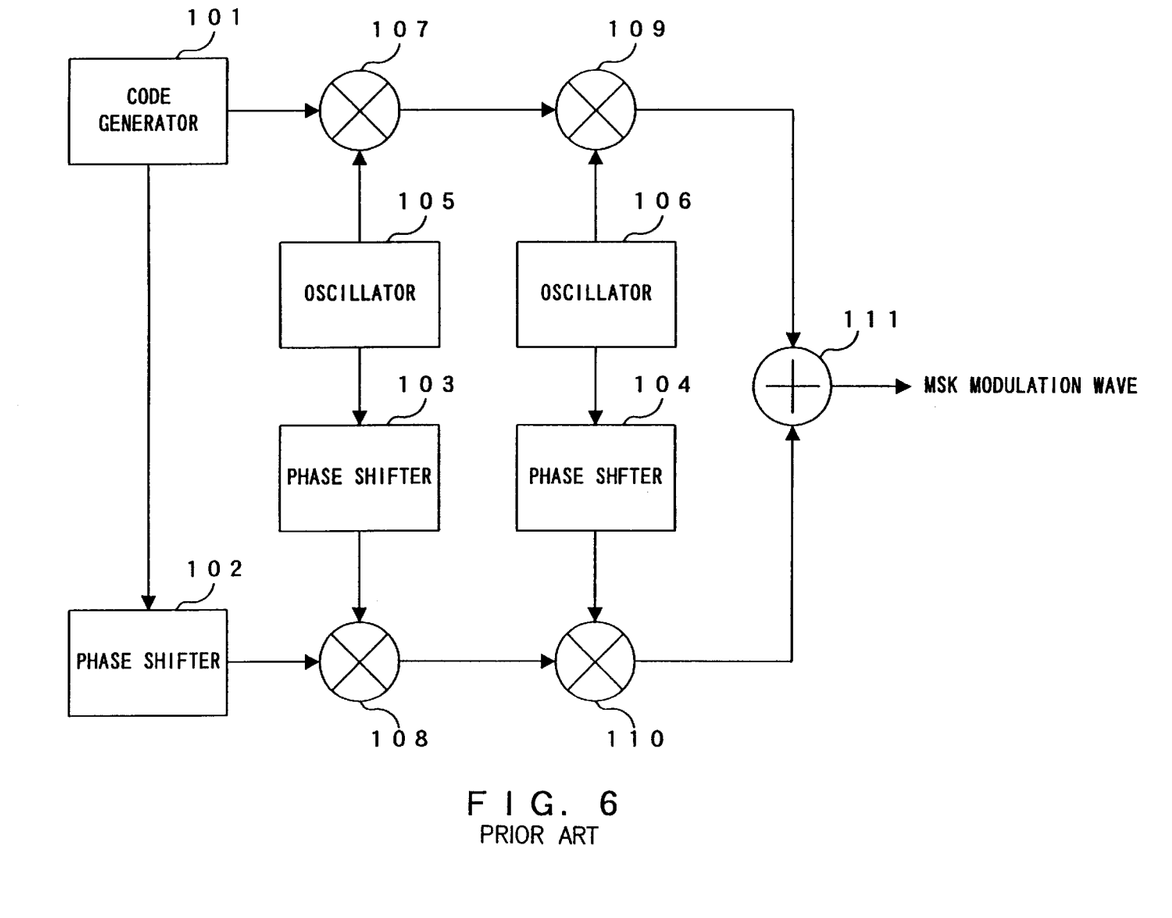
FIG. 6 is a block diagram showing the structure of a conventional MSK modulator.

A conventional MSK modulator illustrated in FIG. 6 for performing an MSK modulation is widely known.

The MSK modulator illustrated in FIG. 6 includes a code generator 101, phase shifters 102 to 104, oscillators 105 and 106, multipliers 107 to 110 and an adder 111.

A to-be-transmitted digital signal generated by the code generator 101 is supplied to the multiplier 107 and to the phase shifter 102. The phase of the digital signal supplied to the phase shifter 102 is delayed ($\pi/2$) radians so as the signal to be supplied to the multiplier 108.

On the other hand, a reference signal of a sine wave or the like supplied from the oscillator 105 is supplied to the multiplier 107 and the phase shifter 103. The phase of the reference signal supplied to the phase shifter 103 is delayed ($\pi/2$) radians, and the signal is supplied to the multiplier 108.

The multiplier 107 generates a signal representing a product of the digital signal supplied from the code generator 101 and the reference signal supplied from the oscillator 105, and supplies the generated signal to the multiplier 109. The multiplier 108 generates a signal representing a product of the digital signal supplied from the phase shifter 102 and the reference signal supplied from the phase shifter 103, and supplies the generated signal to the multiplier 110.

A carrier wave of, for example, a sine wave supplied from the oscillator 106 is supplied to the multiplier 109 and the phase shifter 104. The phase of the carrier wave supplied to the phase shifter 104 is delayed about ($\pi/2$) radians and the carrier wave itself is supplied to the multiplier 110.

The multiplier 109 generates a signal representing a product of the signal supplied from the multiplier 107 and the carrier wave supplied from the oscillator 106, so as to supply the generated signal to the adder 111. The multiplier 110 generates a signal representing a product of the signal supplied from the multiplier 108 and the carrier wave supplied from the phase shifter 104 for supplying the generated signal to the adder 111.

The adder 111 generates a signal representing a sum of signals supplied from the multipliers 109 and 110. The adder 111 then outputs the generated signal as the MSK modulation wave having a carrier wave to which an MSK modulation is performed by a digital signal supplied from the code generator 101.

In a case where the MSK modulator illustrated in FIG. 6 includes analog circuits, the operations of the MSK modulator become unstable owing to a deviation of the operating characteristic in its analog circuits, a stray capacity, an inductance of the wiring or the like. For example, the degree to which the phase shifter causes the phase of the supplied signal to shift may not substantially be ($\pi/2$) radians. The higher the frequency of a phase shifted signal, the more the above phenomenon. In order to overcome the above problems, there is provided a method in which at least a part of the MSK modulator is made of a digital circuit, as disclosed, for example, in the Laid-Open JP Application Kokai No. Heisei 5-63742.

According to the method disclosed in the Laid-Open JP Application Kokai No, Heisei 5-63742, a pair of base band signals which are out of phase from each other by ($\pi/2$) radians are converted from series to parallel. The pair of base band signals are generated in a manner by which to-be-transmitted digital signals delay by using a ½ data delay circuit. The base band signals converted as parallel signals are supplied to an RAM (Random Access Memory) designated by a timing generating circuit, as address data.

The RAM stores various data showing a multiplication result of a master clock and base band signals converted to parallel signals, in its storage region where the value of the base band signals is recognized as an address. When the base band signals as address data are supplied, the RAM outputs the data representing its product.

According to the technique of the Laid-Open JP Application Kokai No. Heisei 5-63742, in a case where a digital signal is transmitted at a speed of, for example, ten megasamples per second, an accurate modulation can not be performed unless the RAM may possibly read out the data at speed as the following data is converted without delay.

In order to enhance conversion accuracy, a large number of patterns of the multiplication result stored in the RAM needs to be arranged. The number of bits of the digital signals converted in parallel at once needs to be larger. Further, it is inevitable that the memory capacity of the RAM needs to be large and the structure of the circuit converting the signals from series to parallel needs to be complex. As a result, the structure of the device becomes even more complicated and large scale.

A method of generating the pair of base band signals as employed in the JP Patent No. Heisei 5-63742, there can be considered a method of using an analog circuit for allowing the phase of a signal to shift, or using a digital signal processing device such as a DSP (Digital Signal Processor) capable of calculating complex numbers for applying a phase shifting.

In the case where the phase of the signal is shifted by using an analog circuit, the problematic phenomenon as explained above arises as the degree to which the phase of the signal shifts may not substantially be ($\pi/2$) radians. It is extremely difficult to keep away from this problematic phenomenon, in a case where the phase shift is performed in terms of the signal including data of ten megasamples per second.

In a case where the digital signal processing device is to calculate complex numbers, the phase shift is not appropriately performed, for data is supplied at a high speed exceeding the calculation speed of the digital signal processing device. Therefore, the phase of the signal including the data of ten megasamples per second is absolutely difficult to be shifted by a calculation of the digital signal processing device.

SUMMARY OF THE INVENTION

The present invention has been made in consideration of the above, and an object thereof is to provide an MSK modulator and MSK modulation method of performing an MSK modulation accurately by using high speed data in digital form, and provided the systematic structure for enabling an MSK modulation accurately by using high speed data in digital form.

In order to achieve the above-described object, according to the first aspect of the present invention, there is provided an MSK modulator comprising:

a digital signal generator (2) which generates a first digital signal representing a first analog signal representing logic values of bits of a to-be-modulated digital signal in accordance with a ($\pi/2$) radian-phase delay or advance of a carrier wave at a predetermined time, and a second digital signal representing a second analog signal which is substantially out of phase about ($\pi/2$) radians with respect to the first analog signal;

a digital-to-analog converter (3I, 3Q) which obtains the first and second digital signals from the digital signal generator so as to convert each of the signals into an analog signal respectively and generates the first and second analog signals; and an orthogonal modulator (6I, 6Q, 7, 8 and 9) which obtains the first and second analog signals from the digital-to-analog converters, and generates an MSK (Minimum Shift Keying) modulation signal representing a sum or difference of a product of instantaneous values of the carrier wave and the first analog signal and a product of instantaneous values of the second analog signal and a signal whose phase substantially shifts about ($\pi/2$) radians.

According to the MSK modulator of the present invention, an MSK modulation wave may be merely obtained by stepping through simple digital signal processing without shifting the phase of the to-be-transmitted data.

In employing the MSK modulator of the present invention, an MSK modulation may be performed accurately with high speed data in digital form.

The digital signal generator comprises:

a bidirectional shift register (2) which stores a bit row comprising a plurality of bits arrayed in form of an annulus wherein continuous half of bits substantially have a logic value identical with one another whereas remaining bits have a logic value distinctive from the logic value of the continuous bits, and obtaining the bits of the to-be-modulated signal so as to allow logic values of the bits in the bit row to shift in a predetermined direction along the array inherent in the logic values of the bits of the to-be-modulated signal; and a partial bit row extraction circuit (OUT 1 to OUT 12) which obtains from the bidirectional shift register a value represented by a first partial bit row substantially including continuous half of bits, supplies the obtained value as the first digital signal to the digital-to-analog converters, obtains from the bidirectional shift register a value represented by a second partial bit row which substantially includes continuous half of bits of the bit row and in which further continuous half of bits of the continuous half overlap with the first partial bit row, and supplies the obtained value as the second digital signal to the digital-to-analog converters. The digital signal generator having the simplified structure may generate a digital signal for generating an MSK modulation wave without using any complex signal processing device, such as a DSP or the like. Hence, an accurate MSK modulation may be performed with high speed data in digital form.

In such a case, every time the bidirectional shift register obtains the signal bit, the logic values of bits in the bit row shifts along the array of annulus for about number of times which is substantially equal to one eighth of number of bits included in the bit row in a predetermined direction inherent in the logic value of the signal bit. Due to this, a digital signal representing two analog signals which are out of phase to each other by ($\pi/2$) radians may be generated by using the device with the simplified structure. Thus, an accurate MSK modulation may be performed with high speed data in digital form.

The digital-to-analog converter may convert a digital signal generating an MSK modulation wave into an MSK modulation wave as an analog signal, the digital-to-analog converter may comprise the means for:

generating the first analog signal representing an analog value which varies monotonically in accordance with number of bits with a predetermined logic value, within the first partial bit row represented by the first digital signal obtained from the digital signal generator; and generating the second analog signal representing an analog value which varies monotonically in accordance with number of bits with a predetermined logic value, within the second partial bit row represented by the second digital signal obtained from the digital signal generator.

The digital-to-analog converter may generate the first analog signal representing the analog value which represents a value indicating number of bits with a predetermined logic value within the obtained first partial bit row being substituted in a sine or cosine function, and may generate the second analog signal representing the analog value which represents a value indicating number of bits with a predetermined logic value within the obtained second partial bit row being substituted in a sine or cosine function. Since the time variation of the MSK modulation wave is to represent a sine and/or cosine function, an occupied band width of the MSK modulation wave may be minimized.

The orthogonal modulators may comprise, for example:

a carrier wave generator (7) which generates the carrier wave;

a phase shifted signal generator (8) which generates a phase shifted signal which is substantially out of phase about ($\pi/2$) radians with respect to the carrier wave; a first multiplier (6I) which obtains the first analog signal from the digital-to-analog converter, and obtains the carrier wave from the carrier wave generator to generate a first product signal representing a product of instantaneous values of the obtained first analog signal and the carrier wave;

a second multiplier (6Q) which obtains the second analog signal from the digital-to-analog converter and the phase shifted signal from the phase shifted signal generator, and generates a second product signal representing a produce of instantaneous values of the obtained second analog signal and the carrier wave; and an adder (9) which obtains the first and second product signals from the first and second multipliers respectively so as to generate the MSK modulation signal representing a sum or difference of instantaneous values of the obtained first and second product signals.

According to the second aspect of the present invention, there is provided an angle modulator; wherein the angle modulator generates a plurality of digital signals each specifying a phase, converts the digital signals into an analog signal respectively so as to generate a plurality of analog signals, and generates an angle modulation wave in accordance with the analog signals, by extracting a plurality of data portions representing a progressive variation of the phase of the angle modulation wave.

According to the angle modulator of the present invention, an angle modulation wave may be obtained by stepping through simplified digital signal processing without shifting a phase of to-be-transmitted data. Thus, an angle modulation, such as a MSK modulation or the like, may be performed accurately with high speed data by using the angle modulator.

The digital signals may be generated by shifting in circulation a bit row continuous half of which substantially have an identical logic value in a predetermined direction inherent in a value represented by a signal component of the angle modulation wave. Further, the digital signals may be generated by extracting a plurality of partial bit rows substantially comprising continuous bits from the bit rows shifting in circulation.

Accordingly, the digital signal which generates the angle modulation wave may be generated by the simplified structure without any complex signal processing device, such as the DSP or the like. Therefore, an accurate angle modulation may be performed with high speed data in digital form.

According to the third aspect of the present invention, there is provided a digital signal generator comprising:
  a bidirectional shift register (2) which stores a bit row comprising a plurality of bits arrayed in form of an annulus wherein continuous half of bits substantially have a logic value identical with each one another, and remaining bits have a logic value distinctive from the logic value of the continuous bits, and allows the logic values of the bits in the bit row to shift in a predetermined direction inherent in the logic values of the signal bits along the bit array, and
  a partial bit row extraction circuit (OUT 1 to OUT 12) which supplies from said shift register to an external device as a digital signal a value represented by a partial bit row which substantially includes continuous half of the bits within the bit row.

Accordingly, the digital signal for generating the angle modulation wave may be generated by the simplified digital signal generator without using any complex signal processing device, such as the DSP or the like. Therefore, an accurate angle modulation may be performed with high speed data in digital form.

According to the fourth aspect of the present invention, there is provided an MSK modulation method comprising:
  a digital signal generating step (2) of generating a first digital signal representing a first analog signal representing logic values of signal bits of a to-be-modulated digital signal in accordance with a ($\pi/2$) radian-phase delay or advance of a carrier wave at a predetermined time, and generating a second digital signal representing a second analog signal which is substantially out of phase about ($\pi/2$) radians with respect to the first analog signal;
  a digital-to-analog converting step (3I, 3Q) of obtaining the first and second digital signals generated by the digital signal generating step so as to convert the signals into an analog signal respectively, and generating the first and second analog signals; and
  an orthogonal modulating step (6I, 6Q, 7, 8, 9) of obtaining the first and second analog signals generated by the digital-to-analog conversion step and generating an MSK (Minimum Shift Keying) modulation signal representing a sum or difference of a product of instantaneous values of the carrier wave and the first analog signal and a product of instantaneous values of the second analog signal and a signal having a phase which is substantially shifted about ($\pi/2$) radians.

According to the angle modulator of the present invention, the angle modulation wave may be obtained by stepping through simplified digital signal processing without shifting a phase of to-be-transmitted data. Thus, an angle modulation, such as a MSK modulation or the like, may be performed accurately with high speed data by using the angle modulator.

According to the fifth aspect of the present invention, there is provided a computer readable storage medium storing a program for executing a computer as:
  a bidirectional shift register (2) which stores a bit row comprising a plurality of bits arrayed in form of an annulus wherein continuous half of the bits substantially have a logic value identical with one another, whereas remaining bits have a logic value distinctive from the logic value of the continuous bits, and obtains signal bits of a to-be-modulated digital signal so as to allow the logic values of the bit row to shift in a predetermined direction inherent in the logic values of the signal bits along an array of the annulus; and
  a partial bit row extraction circuit (OUT 1 to OUT 12) which obtains from the bidirectional shift register a value represented by a first partial bit row of the bit row substantially including continuous half of bits of the bit row, supplies the logic values of the signal bits as a first digital signal in accordance with a ($\pi/2$) radian-phase delay or advance at a predetermined time, obtains from the bidirectional shift register a value represented by a second partial bit row which substantially includes continuous half of bits in the bit row and further continuous half of the continuous bits overlapping with the first partial bit row, and supplies the obtained value as a second digital signal representing a second analog signal which is substantially out of phase about ($\pi/2$) radians with respect to the first analog signal.

According to the computer for executing the program stored in the storage medium, the digital signal for generating the MSK modulation wave may be obtained by using the simple digital signal processing without shifting the phase of the to-be-transmitted data. Therefore, an accurate MSK modulation may be performed with high speed data in digital form.

According to the sixth aspect of the present invention, there is provided a computer readable storage medium wherein,
  a program is stored for allowing a computer to operate as a digital signal generator (2) which generates a first digital signal representing a first analog signal representing the logic values of bits of a to-be-modulated digital signal in accordance with a ($\pi/2$) radian-phase delay or advance at a predetermined time, and generates a second digital signal representing a second analog signal which is substantially out of phase about ($\pi/2$) radians with respect to said first analog signal.

According to the computer for executing the program stored in such a storage medium, the digital signal for generating the MSK modulation wave without shifting the phase of the to-be-transmitted data may be obtained. Thus, the accurate MSK modulation may also be obtained with the high speed data in digital form by employing such a computer.

DETAILED DESCRIPTION OF THE PREFERRED EMBODIMENT

A digital MSK modulator according to one embodiment of the present invention will now be explained, employing an MSK transmitter by way of example.

Figure 1:
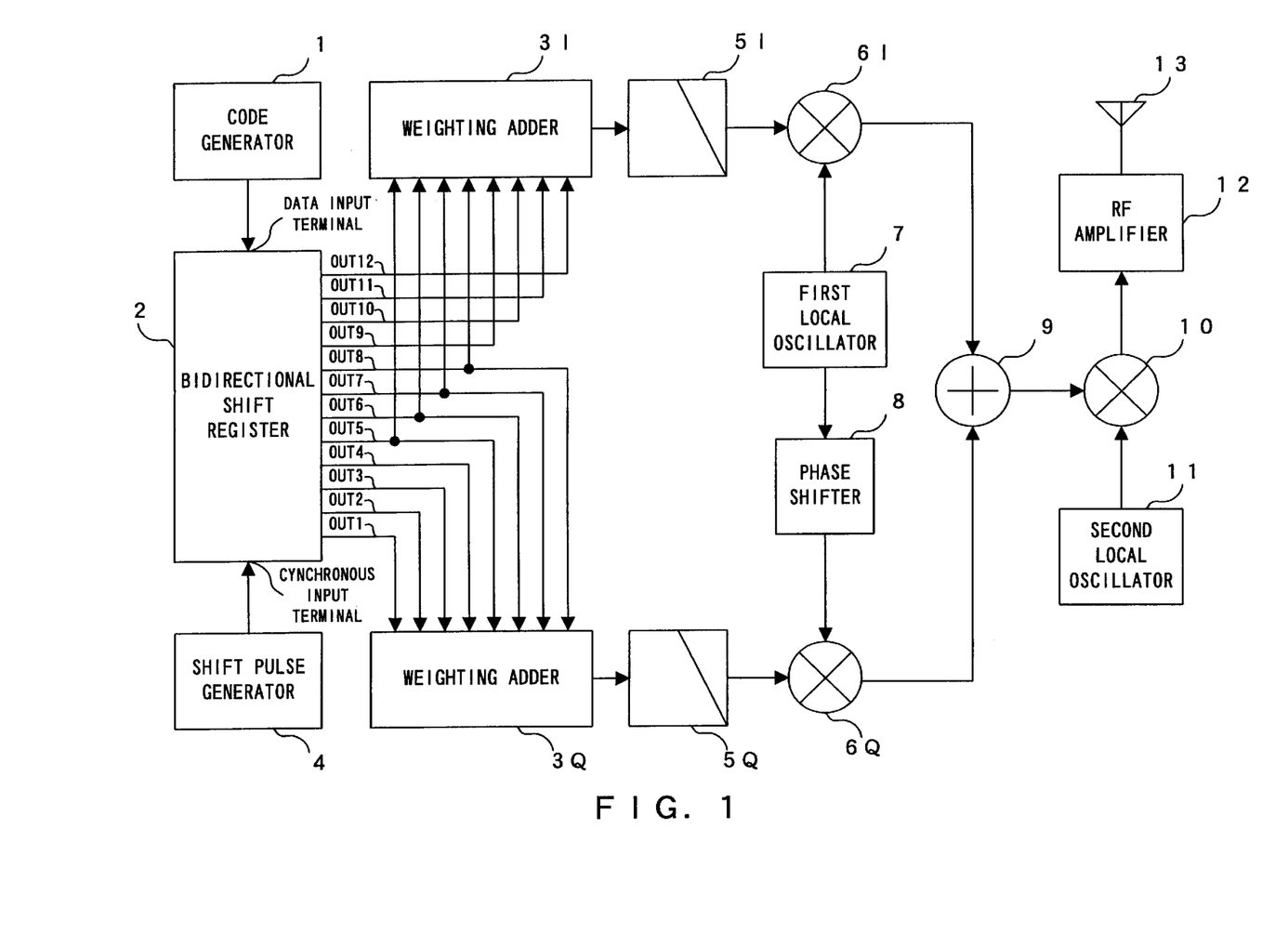
FIG. 1 is a block diagram showing the basic structure of an MSK transmitter according to one embodiment of the present invention.

FIG. 1 is a diagram exemplifying the structure of the MSK transmitter according to one embodiment of the present invention.

As illustrated in FIG. 1, the MSK transmitter comprises a code generator 1, a bidirectional shift register 2, weighting adders 3I and 3Q, a shift pulse generator 4, low-pass filters 5I and 5Q, multipliers 6I and 6Q, a first local oscillator 7, a phase shifter 8, an adder 9, a mixer 10, a second local oscillator 11, an RF (Radio Frequency) amplifier 12 and an antenna 13.

The code generator 1 comprises a computer system which generates a digital signal representing to-be-transmitted information and supplies the generated digital signal to the bidirectional shift register 2.

The digital signal transmitted from the code generator 1 to the bidirectional shift register 2 has a baud rate which is substantially equal to one quarter of the peak frequency of a shift pulse generated by the shift pulse generator 4. The digital signal generated by the code generator 1 synchronizes with the shift pulse. Particularly, the transition (between the first transition and the last transition) of logic values of the digital signal generated by the code generator 1 is substantially made to be coincident with the shift pulse being loaded.

A digital signal generator comprises the bidirectional shift register 2.

The bidirectional shift register 2 comprises an initial section and memory storing sixteen bit data having an array of a row with the most significant bit to the least significant bit. As illustrated in FIG. 1, the bidirectional shift register 2 further includes a synchronous input terminal, a data input terminal and twelve data output terminals OUT1 to OUT 12.

These twelve data output terminals OUT1 to OUT12 are included in a partial bit row extraction circuit.

The bidirectional shift register 2 receives a shift pulse through its own synchronous input terminal from the shift pulse generator 4 and receives a digital signal through its own data input terminal from the code generator 1. Every time the shift pulse is supplied from the shift pulse generator 4, the bidirectional shift register 2 causes the data in the memory to shift in circulation to one bit either in the right direction or in the left direction. The shift in circulation occurs in the left direction when the binary logic value of the digital signal is supplied from the code generator 1 in synchronism with the shift pulse indicates "1", whereas the shift in circulation occurs in the right direction when the logic value of the digital signal indicates "0".

In other words, the sixteen bit data stored in the memory of the bidirectional shift register 2 is substantially arrayed in the form of an annulus with a predetermined number of binary values. As explained above, the digital signal is supplied from the code generator 1 when the shift pulse is supplied to the synchronous input terminal of the bidirectional shift register 2. In this case where the binary logic value of the digital signal indicates "1", the bidirectional shift register 2 allows the data stored in the memory to shift one bit in a predetermined direction along the annulus. On the contrary, the bidirectional shift register 2 causes the data to shift one bit in the reverse direction, in the case where the binary logic value of the digital signal indicates "0".

In a sequential order, the data output terminals of the bidirectional shift register 2 OUT 1, OUT 2, OUT 3, OUT 4, OUT 5, OUT 6, OUT 7, OUT 8, OUT 9, OUT 10, OUT 11, and OUT 12 respectively output a signal representing the binary logic value of the first, second, third, fourth, fifth, sixth, seventh, eighth, ninth, tenth, eleventh, and twelfth least significant one of the sixteen bit data which the memory stores.

Figure 2:
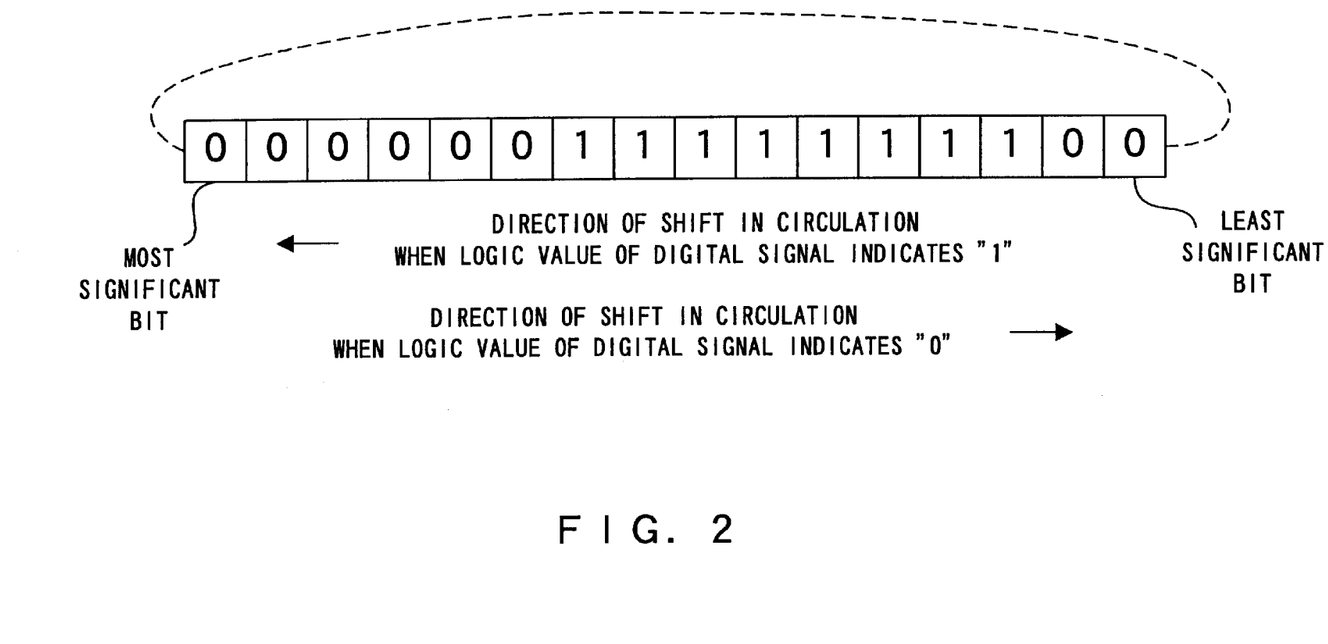
FIG. 2 is a diagram exemplifying an array of a plurality of one-bit data stored in a memory of a bidirectional shift register.

FIG. 2 is a diagram exemplifying an array of bits as data stored in the memory of the bidirectional shift register 2. When the shift pulse is supplied, in a case where the binary logic value of the digital signal supplied from the code generator 1 indicates "1", the bidirectional shift register 2 allows the data of the sixteen bits stored in the memory to shift to the immediate preceding bit respectively. It is noted, however, that the data of the most significant bit shifts to the least significant bit.

When the shift pulse is supplied, in a case where the binary logic value of the digital signal supplied from the code generator 1 indicates "0", the bidirectional shift register 2 allows the data of the sixteen bits stored in the memory to shift to the immediate following bit respectively. It is noted, therefore, that the least significant bit shifts to the most significant bit.

When the initial section of the bidirectional shift register 2 detects that the MSK transmitter of this embodiment has operated, the initial section allows the sixteen bit data stored in its memory to represent the binary numbers "0000000011111111". That is, the eight least significant bits of those stored in the memory are set while the eight most significant bits therein are reset.

As seen from FIG. 2, the most significant bit and the least significant bit of the sixteen bit data are arrayed in a continuous form. Referring to FIG. 2, the sixteen bit data stored in the memory of the bidirectional shift register 2 sustains to be in a state where eight set bits and eight reset bits are arrayed in a continuous form without being apart from each other, while the MSK transmitter operates.

Figure 3:
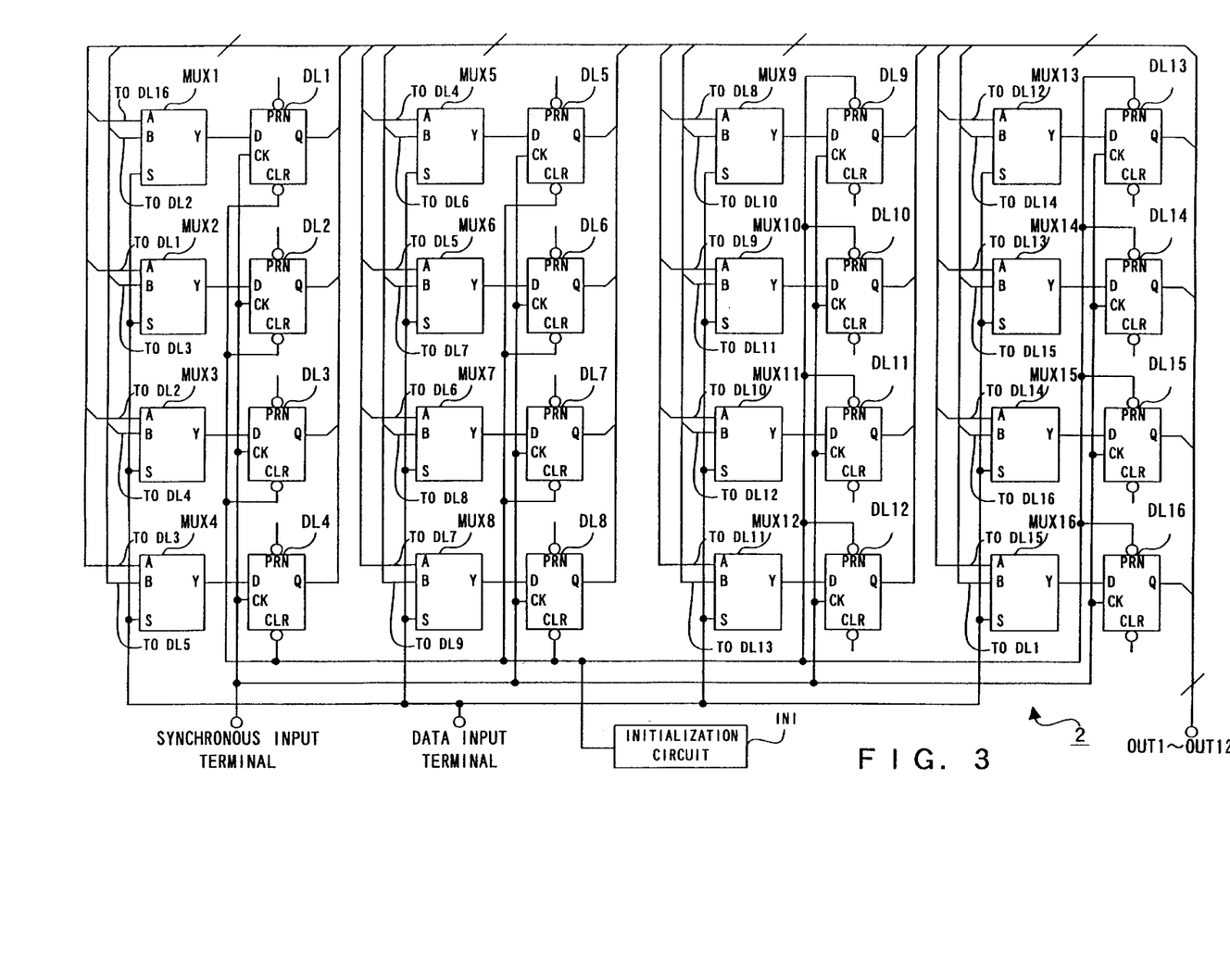
FIG. 3 is a circuit diagram showing the physical structure of the bidirectional shift register.

The physical structure of the bidirectional shift register 2, in more detail, is shown in FIG. 3. The bidirectional shift register 2 shown in FIG. 3 includes multiplexers MUX 1 to MUX 16, latches DL 1 to DL 16 and an initialization circuit INI. The multiplexers MUX 1 to MUX 16 are substantially identical with one another, each having a first input terminal A, a second input terminal B, a select terminal B and an output terminal Y.

In a case where the binary logic value of a voltage applied to its select terminal S thereof represents "0", each of the multiplexers MUX 1 to MUX 16 causes the voltage applied to its first input terminal A to be applied to the output terminal Y. Alternatively, in a case where the binary logic value of a voltage applied to its select terminal S thereof represents "1", each of the multiplexers MUX 1 to MUX 16 causes the voltage applied to its second input terminal B to be applied to the output terminal Y.

In a sequential order, each of the output terminals Y of the multiplexers MUX 1, MUX 2, MUX 3, MUX 4, MUX 5, MUX 6, MUX 7, MUX 8, MUX 9, MUX 10, MUX 11, MUX 12, MUX 13, MUX 14, MUX 15 and MUX 16 is connected to each of the data input terminals D of the latches DL 1, DL 2, DL 3, DL 4, DL 5, DL 6, DL 7, DL 8, DL 9, DL 10, DL 11, DL 12, DL 13, DL 14, DL 15 and DL 16 respectively in one-to-one correspondence with each other.

The select terminals S of the multiplexers MUX 1 to MUX 16 are connected with one another so as to serve as the data input terminal of the bidirectional shift register 2.

The structure of the latches DL 1 to DL 16 is substantially identical with one another and these latches serve as the memory of the bidirectional shift register 2. Each one of the latches DL 1 to DL 16 comprises a data input terminal D, an output terminal Q, a clock terminal CK, a preset terminal PRN and a clear terminal CLR respectively.

When a transition from the binary logic value "1" to the binary logic value "0" indicated by the voltage applied to the clock terminal CK is made, each of the latches DL 1 to DL 16 detects the transition event. Each of the latches DL 1 to DL 16 then stores the binary logic value indicated by the voltage applied to the data input terminal by detecting the transition event. Further, each of the latches DL 1 to DL 16 allows the voltage indicating the stored binary logic value to be applied to the output terminal Q. It should also be noted that each of the latches DL 1 to DL 16 causes a voltage indicating the binary logic value "1" to be applied to the output terminal Q, in a case where a voltage indicating the binary logic value "0" is applied to the preset terminal PRN. On the other hand, each of the latches DL 1 to DL 16 causes a voltage indicating the binary logic value "0" to be applied to the output terminal Q, in a case where a voltage indicating the binary logic value "0" is applied to the clear terminal CLR.

The binary logic value which the latch DL 1 stores is the value of the least significant bit stored in the memory of the bidirectional shift register 2. The binary logic values of the latches DL 2, DL 3, DL 4, DL 5, DL 6, DL 7, DL 8, DL 9, DL 10, DL 11, DL 12, DL 13, DL 14, DL 15 and DL 16 are, in a sequential order, the binary logic values of the second, third, fourth, fifth, sixth, seventh, eighth, ninth, tenth, eleventh, twelfth, thirteenth, fourteenth, fifteenth and sixteenth least significant bits respectively in the memory of the bidirectional shift register 2 respectively.

Each of the latches DL 1 to DL 16 allows a voltage to be applied to its own output terminal Q. The voltage represents the binary logic value of a bit of those stored both in the memory of the bidirectional shift register 2, and in the respective one of the latches. Each one of the output terminals a of the latches DL 1, DL 2, DL 3, DL 4, DL 5, DL 6, DL 7, DL 8, DL 9, DL 10, DL 11 and DL 12 serves as the data terminal OUT 1, OUT 2, OUT 3, OUT 4, OUT 5, OUT 6, OUT 7, OUT 8, OUT9, OUT 10, OUT 11 and OUT 12 of the bidirectional shift register 2 in a sequential order respectively.

Each one of the output terminals Q of the latches DL 1 to DL 16 is connected both to a first input terminal A of the multiplexer which is connected to the data input of a latch storing an immediate preceding bit with respect to a bit stored by the respective latches, and to the second input terminal B of the multiplexer which is connected to a latch storing an immediate following bit with respect to the bit stored by the respective latches.

It is noted that the output terminal 0 of the latch DL 1 is connected both to the second input terminal B of the multiplexer MUX 16 and to the first input terminal A of the multiplexer MUX 2. The output terminal Q of the latch DL 16 is connected both to the second input terminal B of the multiplexer MUX 15 and to the first input terminal A of the multiplexer MUX 1.

The clock terminals CK of the latches DL 1 to DL 16 are connected with one another and serve as a synchronous input terminal of the bidirectional shift register 2. Both of the clear terminals CLR of the latches DL 1 to DL 8 and the preset terminals PRN of the latches DL 9 to DL 16 are connected to the initialization circuit INI.

The preset terminals PRN of the latches DL 1 to DL 8 and the clear terminals CLR of the latches DL 9 to DL 16 do not exhibit their function in this embodiment of the present invention. In order to avoid that the bidirectional shift register 2 illustrated in FIG. 3 operates inappropriately, for example, each one of the preset terminals PRN of the latches DL 1 to DL 8 and the clear terminals CLR of the latches DL 9 to DL 16 are connected to a voltage source which supplies a voltage representing the binary logic value "1" (more specifically, connected to a positive polarity of a direct current power source for driving the bidirectional shift register 2 of FIG. 3, for example).

The initialization circuit INI is included in the initial section of the bidirectional shift register 2 and comprises, for example, a circuit for integrating a direct-source-voltage which is supplied to the MSK transmitter of this embodiment. The initialization circuit INI detects that the MSK ransmitter has operated, and supplies a signal representing the logic value "0" for a certain time to the clear terminals CLR of the latches DL 1 to DL 8 and to the preset terminals PRN of the latches DL 9 to DL 16. As a result, the sixteen bit data which the latches DL 1 to DL 16 store is to express the binary numbers "0000000011111111".

A digital-to-analog converter includes both of the weighting adders 3I and 3Q.

The weighting adder 3I outputs an analog signal representing a value. The value represents eight bit binary logic values from the fifth to the twelfth least significant bits of the entire sixteen bits stored in the memory of the bidirectional shift register 2, and the respective binary logic values are weighted inherently and added with one another.

Specifically, the weighting adder 3I outputs an analog signal representing, for example, a value SI expressed by the right side of equation 1. This analog signal is obtained in a case where X (k) represents the binary logic values and k thereof represents a sequential order of the bits from the least significant bit in the memory of the bidirectional shift register 2.

$$SI = \sin(-\pi/2)$$
$$+ [\{\sin(-3 \cdot \pi/8)\} - \{\sin(-\pi/2)\}] \cdot X \ (5)$$
$$+ [\{\sin(-\pi/4)\} - \{\sin(-3 \cdot \pi/8)\}] \cdot X \ (6)$$
$$+ [\{\sin(-\pi/8)\} - \{\sin(-\pi/4)\}] \cdot X \ (7)$$
$$+ [\{\sin(0)\} - \{\sin(-\pi/8)\}] \cdot X \ (8)$$
$$+ [\{\sin(\pi/8)\} - \{\sin(0)\}] \cdot X \ (9)$$

$+[\{\sin(\pi/4)\}-\{\sin(\pi/8)\}]\cdot X\ (10)$ $+[\{\sin(3\cdot\pi/8)\}-\{\sin(\pi/4)\}]\cdot X\ (11)$ $+[\{\sin(\pi/2)\}-\{\sin(3\cdot\pi/8)\}]\cdot X\ (12)$     (1)

Figure 4:
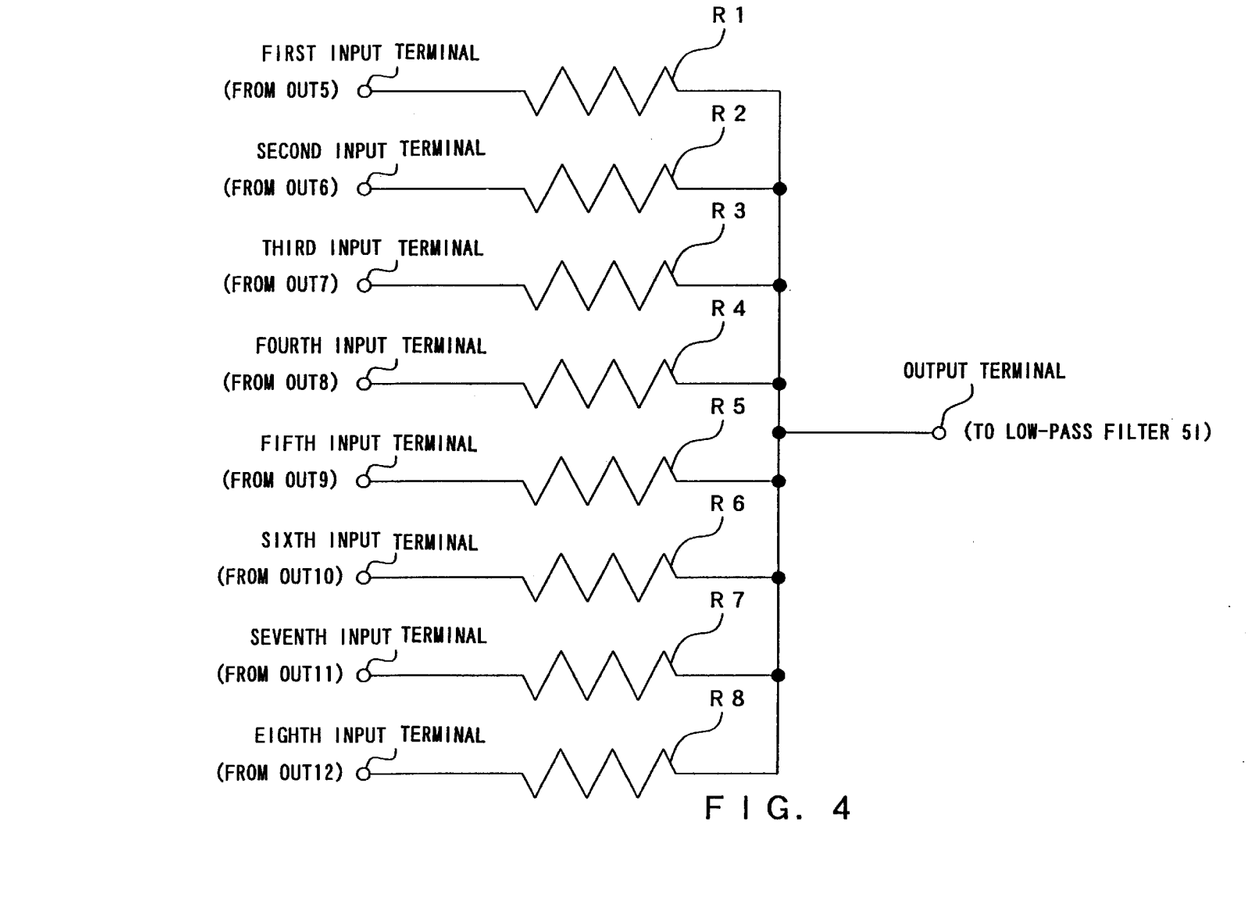
FIG. 4 is a circuit diagram showing the physical structure of a weighting adder.

The structure of the weighting adder 3I is shown in FIG. 4, for example.

The weighting adder 3I illustrated in FIG. 4 comprises resistors R1 to R8.

One end terminal of the resistor R 1 serves as a first input terminal for receiving a signal supplied from the data output terminal OUT 5 of the bidirectional shift register 2. Each one end terminal of the resistors R 2, R 3, R 4, R 5, R 6, R 7 and R 8, in a sequential order, serves as an input terminal of the second, third, fourth, fifth, sixth, seventh and eighth input terminal for receiving a signal from the data output terminals OUT 6, OUT 7, OUT 8, OUT 9, OUT 10, OUT 11 and OUT 12 of the bidirectional shift register 2 respectively.

The other end terminals of the resistors R 1 to R 8 are connected with one another and incorporated as a single output terminal.

In a case where r1, r2, r3 and r4 represent the resistance value of the resistors R 1, R 2, R 3 and R 4, respectively, there is substantially a relative aspect to the resistance values r1 to r4 as shown in equation 2.

$r1: r2: r3: r4$ $=\{\sin(\pi/2)-\sin(3\cdot\pi/8)\}^{-1}$ $:\{\sin(3\cdot\pi/8)-\sin(\pi/4)\}^{-1}$ $:\{\sin(\pi/4)-\sin(\pi/8)\}^{-1}$ $:\{\sin(\pi/8)\}^{-1}$     (2)

The resistance value of the resistor R 5 is substantially equal to the resistance value r4 of the resistor R 4, the resistance value of the resistor R 6 is substantially equal to the resistance value r3 of the resistor R 3, the resistance value of the resistor R 7 is substantially equal to the resistance value r2 of the resistor R 2, and the resistance value of the resistor R 8 is substantially equal to the resistance value r1 of the resistor R 1.

It is assumed that the output terminal of the weighting adder 3I shown in FIG. 4 is connected to one end terminal of a load, a constant voltage is applied to the other end terminal of the load, and a digital voltage of a positive logic (i.e., a binary voltage indicating the binary logic value, and a binary voltage indicating the logic value "1" is higher than a voltage indicating the logic values "0") representing the above logic values X (5) to X (12) is applied to the first to the eighth input terminals. In the case where I $I_{max}$ represents the maximum value of current flowing to the load, an amount of current substantially equal to the value I I shown in equation 3 is to flow to the load. Hence, the amount of the current flowing to the load is substantially to express the above-described value SI.

$I\ I = I\ I_{max} \cdot \{(SI+1)/2\}$     (3)

The structure of the weighting adder 3Q is substantially the same as that of the weighting adder 3I. The weighting adder 3Q outputs an analog signal representing a certain value. That is, the certain value represents eight-bit binary logic values from the first to eighth least significant bits of the entire sixteen bits stored in the memory of the bidirectional shift register 2, and the respective binary logic values are weighted inherently and added with one another.

Specifically, the weighting adder 3Q outputs an analog signal representing a value SQ obtained by equation 4.

$SQ=\sin(-\pi/2)$ $+[\{\sin(-3\cdot\pi/8)\}-\{\sin(-\pi/2)\}]\cdot X\ (1)$ $+[\{\sin(-\pi/4)\}-\{\sin(-3\cdot\pi/8)\}]\cdot X\ (2)$ $+[\{\sin(-\pi/8)\}-\{\sin(-\pi/4)\}]\cdot X\ (3)$ $+[\{\sin(0)\}-\{\sin(-\pi/8)\}]\cdot X\ (4)$ $+[\{\sin(\pi/8)\}-\{\sin(0)\}]\cdot X\ (5)$ $+[\{\sin(\pi/4)\}-\{\sin(\pi/8)\}]\cdot X\ (6)$ $+[\{\sin(3\cdot\pi/8)\}-\{\sin(\pi/4)\}]\cdot X\ (7)$ $+[\{\sin(\pi/2)\}-\{\sin(3\cdot\pi/8)\}]\cdot X\ (8)$     (4)

That the physical structure of the weighting adder 3Q is substantially the same as that of the weighting adder 3I illustrated in FIG. 4. In such a case, each of a first, second, third, fourth, fifth, sixth, seventh and eighth input terminals of the weighting adder 3Q, in a sequential order, receives a signal supplied from the data output terminals OUT 1, OUT 2, OUT 3, OUT 4, OUT 5, OUT 6, OUT 7 and OUT 8 of the bidirectional shift register 2 respectively.

Suppose that the one end terminal of the load is connected to the output terminal of the weighting adder 3Q, a constant voltage is applied to the other end terminal of the load, and a digital voltage of a positive logic representing the above logic values X (1) to X (8) is applied to the first to the eighth input terminals. In this circumstance, in a case where $IQ_{max}$ represents the maximum value of the current flowing to the load, a current whose amount is substantially equal to a value IQ which is expressed in equation 5 and which indicates the value SQ is to flow to the load.

$I\ Q = I\ Q_{max} \{(SQ+1)/2\}$     (5)

The shift pulse generator 4 consists of a rectangular wave oscillator and generates a shift pulse so as to supply the pulse to the synchronous input terminal of the bidirectional shift register 2. The frequency of the shift pulse is substantially four times as much as the baud rate of the digital signal which the code generator 1 supplies to the bidirectional shift register 2.

The low pass filter 5I substantially shuts off a component of a frequency (a frequency which is higher than the Nyquist frequency of a digital code generated by the code generator 1, i.e., a frequency which is more than half of the frequency of the shift pulse generated by the shift pulse generator 4) of the signal output by the weighting adder 3I while the low pass filter 5I makes other components pass through.

A frequency characteristic of the low pass filter 5Q is substantially the same as that of the low pass filter 5I. The low pass filter 5Q filters the signal output from the weighting adder 3Q.

An orthogonal modulator comprises the multipliers 6I and 6Q, the first local oscillator 7, the phase shifter 8 and the adder 9.

The multiplier 6I generates a signal representing a product of a signal passed through the low pass filter 5I and a signal generated by the first local oscillator 7 (that is, the multiplier 6I generates a signal having an instantaneous value representing a product of both an instantaneous value of a value represented by a signal which passed through the low pass filter 5I and an instantaneous value of a value represented by a signal generated by the first local oscillator 7), so as to supply the generated signal to the adder 9.

The multiplier 6Q is substantially identical to the multiplier 6I. Thus, also the multiplier 6Q generates a signal representing a product of a signal which has passed through the low pass filter 5Q and a signal which is generated by the phase shifter 8, and supplies the generated signal to the adder 9.

The first local oscillator 7 includes an oscillator for generating a cosine wave in order to generate a signal representing a cosine wave whose frequency coincides with a predetermined intermediate frequency, and supplies the generated signal to the multiplier 6I and to the phase shifter 8. The phase shifter 8 obtains a signal which is supplied from the first local oscillator 7, generates a signal whose phase substantially advance about (π/2) radians with respect to the cosine wave represented by the obtained signal, and supplies the generated signal to the multiplier 6Q.

The adder 9 generates a signal representing a sum of signals which are supplied from the multipliers 6I and 6Q (the signal with an instantaneous value representing a sum of simultaneously supplied signal values from the multipliers 6I and 6Q at a desired point), and supplies the generated signal to the mixer 10.

The mixer 10 generates a signal representing a component whose frequency is substantially equal to a sum of frequencies of two signals supplied from the adder 9 and the second local oscillator 11. The signal representing the component is one part of a signal representing a signal representing a product of two signals supplied from the adder 9 and the second local oscillator 11. The mixer 10 then supplies the generated signal to the RF amplifier 12.

The second local oscillator 11 includes an oscillator for generating a sine wave, generates a signal representing a sine wave having a frequency which is substantially equal to a difference between an intermediate frequency (i.e., the frequency of the signal generated by the first local oscillator 7) and a predetermined carrier frequency, and the second local oscillator 11 supplies the generated signal to the mixer 10.

The RF amplifier 12 amplifies the signal supplied from the mixer 10 so as to supply the amplified signal to the antenna 13. The antenna 13 emits the supplied signal as an electromagnetic wave.

(Operations)

Operations of the MSK transmitter according to this embodiment of the present invention will now be described.

As soon as the MSK transmitter is driven, the initial section of the bidirectional shift register 2 detects that the power source has been supplied for initializing the memory of the bidirectional shift register 2 (that is, the initial section allows the sixteen bit data stored in the memory to represent the binary numbers "0000000011111111").

The code generator 1 now generates a digital signal representing to-be-transmitted data and supplies the generated digital signal to the data input terminal of the bidirectional shift register 2.

On the other hand, the shift pulse generator 4 generates a shift pulse and supplies the generated pulse to the synchronous input terminal of the bidirectional shift register 2.

The bidirectional shift register 2 receives the shift pulse supplied to its synchronous input terminal from the shift pulse generator 4, and receives the digital signal supplied to its data input terminal from the code generator 1.

Every time the shift pulse is supplied from the shift pulse generator 4, the bidirectional shift register 2 causes the data stored in its memory to shift in circulation either in the right or left direction. The shift in circulation is operated in accordance with the binary logic value of the digital signal supplied from the code generator 1 at the time when the shift pulse is supplied.

The signal which is supplied to the bidirectional shift register 2 by the code generator 1 has the baud rate substantially equal to one quarter of the frequency of the shift pulse generated by the shift pulse generator 4. The shift pulse supplied to the synchronous input terminal of the bidirectional shift register 2 is turned on for four times during a period since the one bit digital signal is supplied to the data input terminal of the bidirectional shift register 2 until the next one-bit digital signal comes to be supplied.

Thus, those bits stored in the memory of the bidirectional shift register 2 shift in circulation in the right or left direction for four times during the one-bit digital signal is supplied.

The weighting adder 3I outputs an analog signal representing the eight-bit binary logic values from the fifth to the twelfth least significant bits of the entire sixteen bits stored in the memory of the bidirectional shift register 2. In more detail, the analog signal is to represent the binary logic values which are weighted inherently and added with one another. The weighting adder 3Q outputs an analog signal representing the eight-bit binary logic value of the least to the eighth least significant bits stored in the memory of the bidirectional shift register 2. The analog signal is to represent the binary logic value which is weighted inherently and added with one another.

In a circumstance where the logic values of the bits stored in the memory of the bidirectional shift register 2 is assumed to shift in the left direction for a given number of "k" times since initialization, a value $S_I(k)$ represented by the analog signal outputted from the weighting adder 3I can be expressed by equation 6, for example.

$$S_I(k) = \cos[\{k \cdot (\pi/8)\} + (\pi/2)] \quad (6)$$

(note that 7 represents the ratio of the circumference of a circle to its diameter, and k represents integers from zero to fifteen)

On the other hand, in a circumstance where the logic value of the bits stored in the memory of the bidirectional shift register 2 is assumed to shift in the left direction for a predetermined number of "k" time(s) since its initialization, a value $S_Q(k)$ represented by the analog signal output from the weighing adder 3Q can be expressed by equation 7, for example.

$$S_Q(k) = \sin[\{k \cdot (\pi/8)\} + (\pi/2)] \quad (7)$$

(note that n represents the ratio of the circumference of a circle to its diameter, and k represents integers from zero to fifteen)

Because of a time variable of the value k, the value $S_I(t)$ of the analog signal output from the weighting adder 3I at the time t and the value $S_Q(t)$ of the analog signal output from the weighting adder 3Q at the time t can be obtained by equations 8 and 9 respectively, when k (t) represents the value k at the time t.

$$S_I(t) = \cos[\{(\pi/8) \cdot k(t)\} + (\pi/2)] \quad (8)$$

$$S_Q(t) = \sin[\{(\pi/8) \cdot k(t)\} + (\pi/2)] \quad (9)$$

The shift of a phase and waveform of analog signals $S_I(t)$ and $S_Q(t)$ will now be explained with reference to FIG. 5.

In a case where a one-bit digital signal D1 with the logic value "1" starts to be supplied to the data input terminal of the bidirectional shift register 2, the bits in the memory of the bidirectional shift register 2 are in an initialized state, and $b_s$ represents the baud rate of the digital signal generated by the code generator 1.

Figure 5:
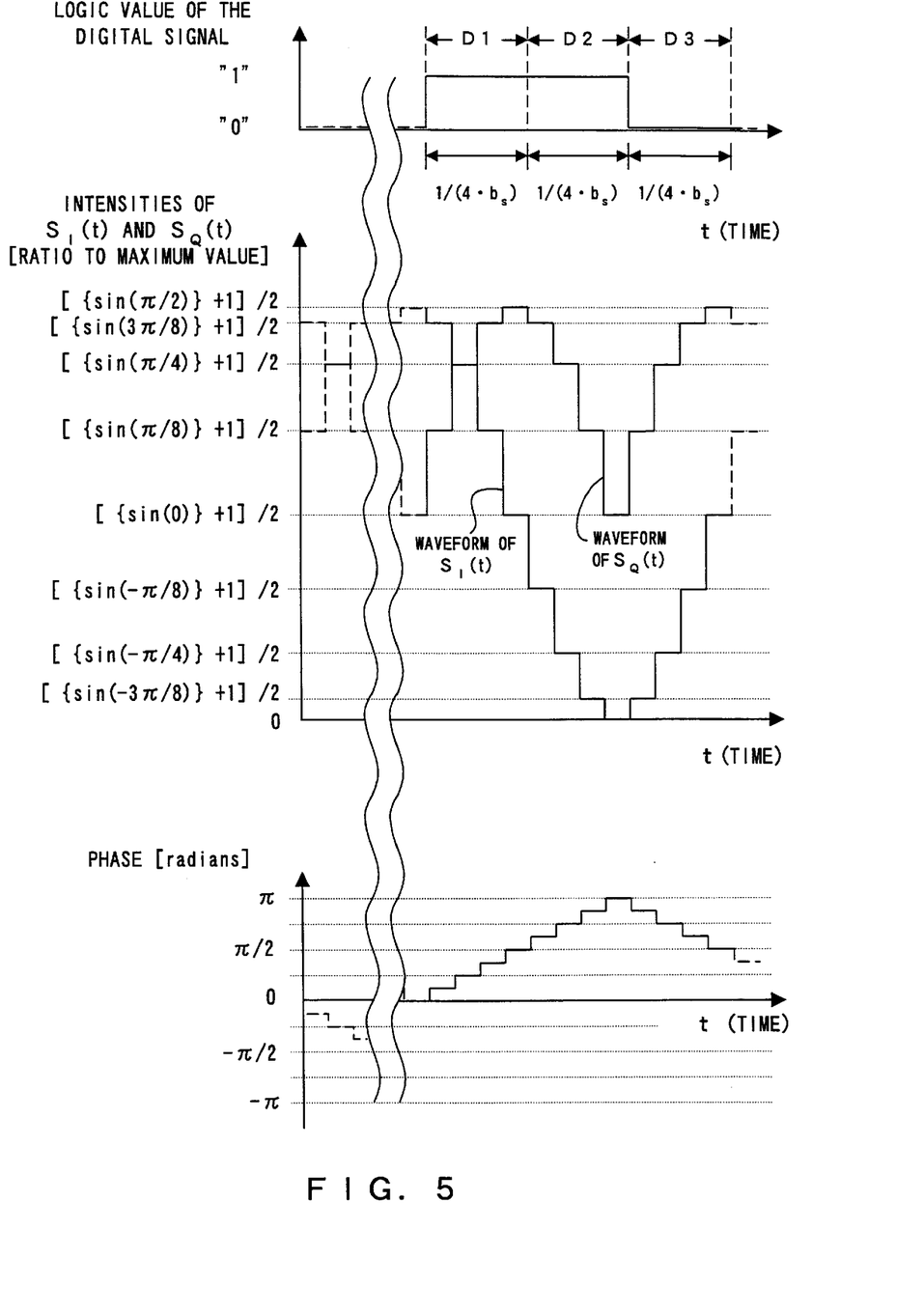
FIG. 5 is a graph showing a waveform of a to-be-transmitted digital signal, a waveform and phase of a signal outputted from the weighting adder shown in the MSK transmitter in FIG. 1.

In this case, the phase shifting and waveform of the analog signals $S_I(t)$ and $S_Q(t)$ are shown in FIG. 5, for example.

As seen from FIG. 5, while supplying the digital signal D1, the waveform of the analog signal $S_I(t)$ output from the weighting adder 3I represents four sections in a quarter period of a cosine wave. Particularly, there are sampled four points from the first point in the quarter period at intervals of one sixteenth period. The phase angle of the cosine wave having a frequency $(b_s/4)$ has to be in a range from $(\pi/2)$ to $\pi$.

The waveform of the analog signal $S_I(t)$ output from the weighting adder 3Q represents four sections in a quarter period of a cosine wave. Particularly, there are sampled four points from the first point in the quarter period at intervals of one sixteenth period. The phase angle of the cosine wave having a frequency $(b_s/4)$ has to be a range from $(\pi/2)$ to $\pi$.

As illustrated in FIG. 5, the phases of the analog signals $S_I(t)$ and $S_Q(t)$ substantially advance $(\pi/8)$ radians at time intervals of $\{1/(4 \cdot b_s)\}$, resulting in $(\pi/2)$ radians for the total.

It is assumed that a one-bit digital signal D2 having the logic value "1" is supplied to the data input terminal of the bidirectional shift register 2. In such a case, while supplying the digital signal D2, the waveform of the analog signal $S_I$ (t) output from the weighting adders 3I and 3Q represents four sections in the quarter period of the phase angle of the cosine wave. Particularly, each of these four sections is sampled at the interval of one sixteenth period, from the head one section in the quarter period as illustrated in FIG. 5. The phase angle of the cosine wave having a frequency $(b_s/4)$ has to be in the range from $\pi$ to $\{3 \cdot (\pi/2)\}$.

As shown in FIG. 5, the phases of the analog signals $S_I(t)$ and $S_Q(t)$ substantially advance $(\pi/8)$ radians at time intervals of $\{1/(4 \cdot b_s)\}$, resulting in $(\pi/2)$ radians for the total.

Further, a one-bit digital signal D3 having the logic value "0" is supplied to the data input terminal of the bidirectional shift register 2. In such a case, while supplying the digital signal D3, the waveform of the analog signal $S_I(t)$ output from the weighting adders 3I and 3Q represents four sections in a quarter period of the phase angle of a cosine wave. Particularly, each of these four sections is sampled at an interval of one sixteenth period, from the end one section in the quarter period in reverse of the time. The phase angle of the cosine wave having a frequency $(b_s/4)$ has to be in a range from $\pi$ to $\{3 \cdot (\pi/2)\}$ as illustrated in FIG. 5.

As shown in FIG. 5, the phases of the analog signals $S_I(t)$ and $S_Q(t)$ substantially shift back $(\pi/8)$ radians at time intervals of $\{1/(4 \cdot b_s)\}$, resulting in the shift back of $(\pi/2)$ radians for the total.

The weighing adder 3I outputs an analog signal having frequency components which are lower than half of the frequency of the shift pulse and which are supplied to the multiplier 6I via the low pass filter 5I. On the other hand, the weighting adder 3Q supplies the analog signal having the frequency components which are lower than half of the frequency of the shift pulse and which are supplied to the multiplier 6Q via the low pass filter 5Q.

The first local oscillator 7 generates a signal representing a cosine wave whose frequency coincides with the intermediate frequency f. (specifically, the signal expressed by equation 10 as a value $v_I(t)$), and supplies the generated signal to the multiplier 6I and to the phase shifter 8.

$$v_I(t) = A_0 \cdot \cos(\omega_c \cdot t) \tag{10}$$

(where, $A_0$ represents amplitude, and $\omega_c = 2 \cdot \pi \cdot f_c$)

When the signal $v_I(t)$ is supplied from the first local oscillator 7, the phase shifter 8 generates a signal $v_Q(t)$ having a phase which is delayed $(\pi/2)$ radians with respect to the phase of the signal $v_I(t)$, and supplies the generated signal to the multiplier 6Q. The value of the signal $v_Q(t)$ can be obtained by equation 11, for example.

$$v_Q(t) = A_0 \cdot \sin(\omega_c \cdot t) \tag{11}$$

The multiplier 6I generates a signal representing a product of a value of the signal $S_I(k)$ which has passed through the low pass filter 5I and a value of the signal $v_I(t)$ generated by the first local oscillator 7, and supplies the generated signal to the mixer 10. In a case where I (t) represents a signal supplied from the multiplier 6I to the adder 9, the instantaneous value of I (t) can be expressed by equation 12.

$$I(t) = B_0 \cdot \{\cos(\omega_c \cdot t)\} \times \cos[\{(\pi/8) \cdot k(t)\} + (\pi/2)] \tag{12}$$

(where, $B_0$ represents amplitude)

Similarly, as performed by the amplitude unit 6I, the amplitude unit 6Q generates a signal representing a product of a value of the signal $S_Q(k)$ which has passed through the low pass filter 5Q and a value of the signal $v_Q(t)$ generated by the phase shifter 8, and supplies the generated signal to the mixer 10. In a case where Q (t) represents a signal supplied from the multiplier 6Q to the adder 9, the instantaneous value of Q (t) can be expressed by equation 13.

$$Q(t) = B_0 \{\sin(\omega_c \cdot t)\} \times \sin[\{(\pi/8) \cdot k(t)\} + (\pi/2)] \tag{13}$$

The adder 9 generates a signal S (t), which can be expressed in equation 14, having an instantaneous value of a signal representing a sum of signals supplied from the multipliers 6I and 6Q, so as to supply the generated signal to the mixer 10. The signal S (t) obtained accordingly is to express an MSK modulation wave obtained when an MSK modulation is applied to a carrier wave of the frequency $f_s$ by the digital signal supplied from the code generator 1.

$$\begin{aligned} S(t) &= I(t) + Q(t) \\ &= B_0 \cdot \cos[(\omega_c \cdot t) - \{(\pi/8) \cdot k(t)\} - (\pi/2)] \\ &= B_0 \cdot \sin[(\omega_c \cdot t) - \{(\pi/8) \cdot k(t)\}] \end{aligned} \tag{14}$$

The second local oscillator 11 generates a signal v (t) representing a sine wave of a frequency substantially equal to a difference $(f - f_c)$ between the carrier frequency f and the intermediate frequency $f_c$, and supplies the generated signal to the mixer 10. The value of the signal v (t) can specifically be expressed by equation 15, for example.

$$v(t) = C_0 \cdot \sin\{(\omega - \omega_c) \cdot t\} \tag{15}$$

(where, $C_0$ represents amplitude, and $\omega = 2 \cdot \pi \cdot f$)

When the mixer 10 receives the signal S (t) supplied from the adder 9 and the signal v (t) supplied from the second local oscillator 11, the mixer 10 generates a signal F (t) representing a component whose frequency is substantially equal to a sum of the two signal frequencies. It should be noted that the signal representing the component is one part of a signal representing a signal representing a product of these two signals. The mixer 10 then supplies the generated signal to the RF amplifier 12. The value of the signal F (t) is specifically expressed by equation 16.

$$F(t) = D_0 \cdot \sin[(\omega \cdot t) - \{(\pi/8) \cdot k(t)\}] \tag{16}$$

(where, $D_0$ represents amplitude)

The value k (t) constantly either increases or decreases its single number until the number becomes four for the total, at time intervals substantially coincides with one quarter of the digital signal length, during a period of time since the one-bit digital signal from the code generator 1 starts to be supplied until the signal ends to be supplied.

During the period of time since the one-bit digital signal from the code generator 1 starts to the supplied until the signal ends to the supplied, the phase of the signal F (t) either advancesor is delayed (π/8) radians at time intervals substantially coincides with one quarter of the digital signal length, resulting in advancing or delaying (π/2) radians for the total.

The obtained signal F (t) is to represent an MSK modulation wave which is obtained when an MSK modulation is applied to the carrier wave of the frequency f by the digital signal supplied from the code generator 1.

The RF amplifier 12 amplifies the signal F (t) supplied from the mixer 10 and supplies the amplified signal to the antenna 13. Thus, antenna 13 emits the MSK modulation wave whose instantaneous value is substantially proportional to the instantaneous value of the signal F (t) as an electromagnetic wave.

The structure of the MSK transmitter of the present invention is not limited to the above.

Instead, a part or the entire portion of the code generator 1, bidirectional shift register 2, or shift pulse generator 4 may be a DSP (Digital Signal Processor), a CPU (Central Processing Unit) and/or the like. Either one of the weighting adders 3I and 3Q may be a D/A (Digital-to-Analog) converter. Further, a part or the entire part of the low pass filters 5I, 5Q, multipliers 6I, 6Q, first local oscillator 7, phase shifter 8 or adder 9 may be an A/D (Analog-to-Digital) converter, DSP and/or D/A converter.

It is not necessary that the MSK transmitter emits the generated MSK modulation wave from the antenna 13, therefore, the MSK transmitter can transmits the generated MSK modulation wave via a cable line, for example. The to-be-transmitted digital signal can be one which has already been modulated by a desired method. The mixer 10, the second local oscillator 11 and the RF amplifier 12 are not necessarily equipped thus can be omitted.

The weighting adders 3I and 3Q can arbitrarily weight the supplied bits. As far as the value of the band width possessed by the MSK modulation wave is smaller than a desired value, the weighting adders 3I and 3Q are not necessarily add the weight to the analog signal representing a sample part of the cosine or sine wave. Hence, the weighting adders 3I and 3Q may output, for example, an analog signal representing a sample part of a triangular wave.

The signal provided by the bidirectional shift register 2 to the weighting adder 3I may not necessarily be representing the logic values of the fifth to the twelfth least significant bits. Further, the signal provided by the bidirectional shift register 2 to the weighting adder 3Q may not necessarily be representing the logic values of the first to the eighth least significant bits.

The signals supplied to the weighting adder 3I and 3Q may be representing, (1) a plurality of bits substantially half of which are continuously arrayed without being apart from one another in an array which the bidirectional shift register 2 stores, in a case where the most significant bit and the least significant bit are assumed to be arrayed in a continuous form, and (2) a plurality of bits substantially half of which represented by the signal supplied to the weighting adder 3Q overlap with remaining bits represented by the signal supplied to the weighting adder 3I.

The data stored in the memory of the bidirectional shift register 2 does not necessarily include the sixteen bits, but the data may have eight bits, thirty two bits.

As long as desired modulation accuracy can be obtained, the signals supplied from the bidirectional shift register 2 to the weighting adders 3I and 3Q may possibly have the different number of bits. In this case, an odd number of bits may be stored as the data stored in the memory of the bidirectional shift register 2. In addition, in the case where desired modulation accuracy can be obtained, the phases of the signal output from the weighting adders 3I and 3Q may not be out of phase to each other exactly by (π/2) radians.

The so-far described MSK modulator according to the present invention can be realized with an exclusive system as well as an ordinary computer system. The MSK modulator executing the above operations can be realized by installing a program for executing the above operations to a computer comprising the A/D converter and the D/A converter, from a recording medium, such as a floppy disk, a CD-ROM or the like, and storing the program.

As a medium for providing a program into a computer, a communication medium can be employed (a medium which retains a program temporarily in a fluid manner, such as a communication circuit, a communication network or a communication system, etc.). The code constituting the program may be embedded in a carrier wave. For example, the program can be uploaded on the Bulletin Board Systems (BBS) of the communication network so that the system (program code) can be embedded in the carrier wave of the network and transmitted via the network.

When this program runs, the above operations can be executed by executing the program in the way other application programs are done under the control of the OS.

In a case where a part of the operations is assigned to the OS or the OS comprises one of the structural elements of the present invention, a program excluding the part which is already included in the OS can be stored in a storage medium. Even in this case, according to the present invention, a program for executing the operations or the steps executed by the computer is supposed to be stored in the storage medium.

According to the present invention, as explained above, an MSK modulator and an MSK modulation method of performing an MSK modulation accurately with high speed data in digital form, and the systematic structure capable of performing an MSK modulation accurately with high speed data in digital form can be realized.

What is claimed is:

1. An MSK modulator comprising:

a digital signal generator which generates a first digital signal corresponding to a first analog signal representing a logic value of bits of a to-be modulated digital signal in accordance with a π/2 radian-phase delay or advance of a carrier wave at a predetermined time, and a second digital signal corresponding to a second analog signal which is substantially about π/2 radians out of phase with respect to said first analog signal;

a digital-to-analog converter which obtains said first and second digital signals from said digital signal generator and converts each of the first and second digital signals into first and second analog signals respectively; and an orthogonal modulator which obtains said first and second analog signals from said digital-to-analog converter, and generates an MSK (Minimum Shift Keying) modulation signal representing a sum or difference of a product of instantaneous values of said carrier wave and said first analog signal and a product of instantaneous values of said second analog signal and a signal whose phase substantially shifts about π/2 radians;

wherein the digital signal generator further comprises:

a bidirectional shift register which stores predetermined data having continuous plural bits arranged in an annulus wherein a continuous half of all of the bits of the predetermined data substantially have a logic value respectively identical with one another, and remaining bits of the predetermined data other than the continuous half of all of the bits have a logic value distinct from said logic value of the continuous half of all of the bits, and obtains said bits of the to-be-modulated digital signal so as to allow the logic values of the bits in the predetermined data to shift in a predetermined direction inherent in said logic values of said bits of the to-be-modulated digital signal; and an extraction circuit which obtains from the bidirectional shift register a value represented by first partial data substantially including the continuous half of all of the bits of said predetermined data, supplies the obtained value as a first digital signal to said digital-to-analog converter, obtains from said bidirectional shift register a value represented by second partial data which substantially includes the continuous half of all of the bits of the predetermined data and in which the continuous half of bits of the second partial data overlap with said first partial data, and supplies the obtained value as a second digital signal to said digital-to-analog converter.

2. The MSK modulator according to claim 1 wherein:

said bidirectional shift register causes the logic values of bits of said predetermined data to shift therein for about a number of times which is substantially equal to one eighth of a number of bits included in said predetermined data in a predetermined direction inherent in said logic values of the signal bit, every time said signal bit is supplied to said bidirectional shift register.

3. The MSK modulator according to claim 1 wherein said digital-to-analog converter further comprises:

a first signal generator which generates a first analog signal representing an analog value which varies in accordance with the number of bits with a predetermined logic value, within said first partial data; and a second signal generator which generates a second analog signal representing an analog value which varies in accordance with the number of bits with a predetermined logic value, within said second partial data.

4. The MSK modulator according to claim 3 wherein said digital-to-analog converter corresponds to said first and second signal generators which generate said first analog signal corresponding to an analog value which represents a value indicating the number of bits with a predetermined logic value within said first partial data being substituted in a sine or cosine function, and said second analog signal which corresponds to an analog value which represents a value indicating the number of bits with a predetermined logic value within said obtained second partial data being substituted in a sine or cosine function.

5. The MSK modulator according to claim 2 wherein said digital-to-analog converter further comprises:

a first signal generator which generates a first analog signal representing an analog value which varies in accordance with the number of bits with a predetermined logic value, within said first partial data; and a second signal generator which generates a second analog signal representing an analog value which varies in accordance with the number of bits with a predetermined logic value, within said second partial data.

6. The MSK modulator according to claim 5 wherein said digital-to-analog converter corresponds to said first and second signal generators which generate said first analog signal corresponding to an analog value which represents a value indicating the number of bits with a predetermined logic value within said first partial data being substituted in a sine or cosine function, and said second analog signal which corresponds to an analog value which represents a value indicating the number of bits with a predetermined logic value within said second partial data being substituted in a sine or cosine function.

7. The MSK modulator according to claim 1 wherein said orthogonal modulator comprises:

a carrier wave generator which generates said carrier wave;

a phase shifted signal generator which generates a phase shifted signal which is substantially about π/2 radians out of phase with respect to said carrier wave;

a first multiplier which obtains said first analog signal from said digital-to-analog converter and said carrier wave from said carrier wave generator to generate a first product signal representing a product of instantaneous values of said obtained first analog signal and said carrier wave;

a second multiplier which obtains said second analog signal from said digital-to-analog converter and said phase shifted signal from said phase shifted signal generator to generate a second product signal representing a product of instantaneous values of said obtained second analog signal and of said carrier wave; and an adder which obtains said first and second product signals from said first and second multipliers respectively so as to generate said MSK modulation signal representing a sum or difference of instantaneous values of said obtained first and second product signals.

8. An angle modulator which generates a plurality of digital signals each specifying a phase, converts said digital signals into analog signals respectively so as to generate a plurality of analog signals, and generates an angle modulation wave based on said plurality of analog signals, by extracting a plurality of data portions representing a progressive variation of said phase of said angle modulation wave wherein said digital signals are generated by shifting a bit row in continuous circulation, half of which substantially have an identical logic value in a predetermined direction inherent in a value represented by a signal component of said angle modulation wave, and by extracting a plurality of partial bit rows which substantially comprise continuous bits.

9. A digital signal generator comprising:

a bidirectional-shift register which stores predetermined data including continuous plural bits in a form of an annulus wherein a continuous half of all of the bits of the predetermined data substantially have a logic value identical to one another, and remaining bits of the data other than the continuous half of all of the bits have a logic value distinct from said logic value of bits, and allows the logic values of the bits in the predetermined data to shift in a predetermined direction; and a partial bit row extraction circuit which supplies from said shift register to an external device as a digital signal a value represented by partial data substantially including the continuous half of all of the bits in the predetermined data.

10. An MSK modulation method comprising:
- a first digital signal generating step of generating a first digital signal corresponding to a first analog signal representing logic values of signal bits of a to-be-modulated digital signal in accordance with a π/2 radian-phase delay or advance of a carrier wave at a predetermined time;
- a second digital signal generating step for generating a second digital signal corresponding to a second analog signal which is substantially about π/2 radians cut of phase with respect to said first analog signal;
- a digital-to-analog conversion step of obtaining said first and second digital signals generated by said digital signal generating step and converting the first and second digital signals into first and second analog signals respectively; and
- an orthogonal modulation step of obtaining said first and second analog signals generated by said digital-to-analog conversion step and generating an MSK (Minimum Shift Keying) modulation signal representing a sum or difference of a product of instantaneous values of said carrier wave and said first analog signal and of a product of instantaneous values of a signal whose phase is substantially shifted about π/2 radians with respect to said carrier wave and of said second analog signal,
- wherein said digital signal generating step further comprises:
  - a shifting step which stores predetermined data comprising continuous plural bits arranged in an annulus wherein a continuous half of all of the bits of the predetermined data substantially have a logic value identical with one another, and remaining bits of the predetermined data other than the continuous half of all of the bits have a logic value distinct from said logic value of bits, and allows the logic values of the data to shift in a predetermined direction; and
  - an extraction step which extracts partial bits from the data which is being shifted by said shifting step, the partial bits including the continuous half of all of the bits of the predetermined data.

11. A computer readable storage medium storing a program to be executed by a computer by which said computer has functions of:
- a bidirectional shift register which stores predetermined data having continuous plural bits arranged in an annulus wherein a continuous half of all the bits of the predetermined data substantially have a logic value respectively identical with one another, whereas remaining bits of the predetermined data other than the continuous half of all the bits have a logic value distinct from said logic value of the continuous half of all of the bits, obtains signal bits of a to-be-modulated digital signal and allows the logic values of said predetermined data to shift in a predetermined direction inherent in the logic values of said signal bits; and
- an extraction circuit which obtains from said bidirectional shift register a value represented by first partial data having the continuous half of bits within said predetermined data, supplies said obtained value as a first digital signal corresponding to a first analog signal representing said logic values of said signal bits in accordance with a π/2 radian-phase delay or advance at a predetermined time, obtains from said bidirectional shift register a value represented by second partial data which substantially includes continuous half of all of the bits in said predetermined data and the continuous half of said second partial data overlapping with said first partial data, and supplies said obtained value as a second digital signal representing a second analog signal which is substantially about π/2 radians out of phase with respect to said first analog signal.

12. A computer data signal embedded in a carrier wave and being executed by a computer by which said computer has functions of:
- a bidirectional shift register which stores predetermined data having continuous plural bits arranged in an annulus wherein a continuous half of all of the bits of the predetermined data substantially have a logic value respectively identical with one another, whereas remaining bits of the predetermined data other than the continuous half of all the bits have a logic value distinct from said logic value of the continuous half of all of the bits, obtains signal bits of a to-be-modulated digital signal and allows the logic values of said predetermined data to shift in a predetermined direction inherent in the logic values of said signal bits; and
- an extraction circuit which obtains from said bidirectional shift register a value represented by first partial data having the continuous half of bits within said predetermined data, supplies said obtained value as a first digital signal corresponding to a first analog signal representing said logic values of said signal bits in accordance with a π/2 radian-phase delay or advance at a predetermined time, obtains from said bidirectional shift register a value represented by second partial data which substantially includes the continuous half of bits in said predetermined data and the continuous half of said second partial data overlapping with said first partial data, and supplies said obtained value as a second digital signal representing a second analog signal which is substantially about π/2 radians out of phase with respect to said first analog signal.

* * * * *

UNITED STATES PATENT AND TRADEMARK OFFICE
CERTIFICATE OF CORRECTION

PATENT NO.   : 6,201,451 B1
DATED        : March 13, 2001
INVENTOR(S)  : Katsufumi Hata It is certified that error appears in the above-identified patent and that said Letters Patent is hereby corrected as shown below:

<u>Title page,</u>
Item [73], Assignee:, change "UCOM" to -- ICOM --.

Signed and Sealed this

Sixth Day of August, 2002

Attest:

JAMES E. ROGAN
*Attesting Officer*     *Director of the United States Patent and Trademark Office*